(12) United States Patent
Saito

(10) Patent No.: US 11,521,040 B2
(45) Date of Patent: Dec. 6, 2022

(54) COMPUTER-READABLE RECORDING MEDIUM, LEARNING METHOD, AND LEARNING DEVICE

(71) Applicant: FUJITSU LIMITED, Kawasaki (JP)

(72) Inventor: Takahiro Saito, Asaka (JP)

(73) Assignee: FUJITSU LIMITED, Kawasaki (JP)

( * ) Notice: Subject to any disclaimer, the term of this patent is extended or adjusted under 35 U.S.C. 154(b) by 994 days.

(21) Appl. No.: 16/251,125

(22) Filed: Jan. 18, 2019

(65) Prior Publication Data

US 2019/0228286 A1     Jul. 25, 2019

(30) Foreign Application Priority Data

Jan. 19, 2018    (JP) .............................. JP2018-007440

(51) Int. Cl.
     *G06N 3/04*         (2006.01)
     *G06K 9/62*         (2022.01)
     *G06F 17/16*       (2006.01)

(52) U.S. Cl.
     CPC .............. *G06N 3/04* (2013.01); *G06F 17/16* (2013.01); *G06K 9/6256* (2013.01); *G06K 9/6262* (2013.01); *G06K 9/6271* (2013.01)

(58) Field of Classification Search
     CPC ........ G06F 16/367; G06F 17/16; G06F 17/12; G06K 9/6247; G06K 9/6256;
(Continued)

(56) References Cited

U.S. PATENT DOCUMENTS 6,807,536 B2 * 10/2004 Achlioptas ........... G06K 9/6247
                                                      324/303
6,941,289 B2 * 9/2005 Goodnight ............... G06N 3/08
                                                       706/15
(Continued)

FOREIGN PATENT DOCUMENTS

JP      2014-059754      4/2014
JP      2015-088188      5/2015
(Continued)

OTHER PUBLICATIONS

Koji Maruhashi, "Deep Tensor: Eliciting New Insights from Graph Data that Express Relationships between People and Things", Fujitsu Sci. Tech. J., vol. 53, No. 5, pp. 26-31, Sep. 2017 (6 pages).

*Primary Examiner* — Gerald Gauthier
(74) *Attorney, Agent, or Firm* — Fujitsu Patent Center

(57) ABSTRACT

A non-transitory computer-readable recording medium stores a learning program that causes a computer to execute a process including: extracting, from a plurality of data groups, a plurality of first data groups having an order; generating, for each data element corresponding to each of the first data groups, an ordered data matrix in which data elements having same order have value corresponding to relationship among the data elements and data elements having different orders have values corresponding to the different orders; and obtaining input tensor data by performing tensor decomposition with the ordered data matrix, inputting the input tensor data to a neural network at time of performing deep machine learning, performing deep machine learning of the neural network, and learning about method for the tensor decomposition.

5 Claims, 9 Drawing Sheets

(58) Field of Classification Search
CPC .... G06K 9/6262; G06K 9/6271; G06K 9/623;
G06N 3/04; G06N 3/08; G06N 3/084;
G06N 3/105; G06N 7/005; G06N 20/00;
G06N 3/02; G06N 5/02; G06Q 30/0204;
G06Q 10/20; G06V 10/30; G06V 10/82;
G01D 5/00; G05B 13/027; G16H 30/40;
H04L 63/1425
USPC ...................... 706/12, 15; 707/738
See application file for complete search history.

(56) References Cited

U.S. PATENT DOCUMENTS

| | | | | |
|---|---|---|---|---|
| 10,489,479 | B1* | 11/2019 | Shalev | G06F 17/12 |
| 10,692,004 | B1* | 6/2020 | Segev | G06Q 10/20 |
| 11,200,982 | B2* | 12/2021 | Chen | G06N 3/08 |
| 2002/0107822 | A1* | 8/2002 | Helmick | G06N 3/08 |
| | | | | 706/26 |
| 2015/0120011 | A1 | 4/2015 | Rolfsmeier et al. | |
| 2015/0206051 | A1* | 7/2015 | McIntosh | G06N 3/04 |
| | | | | 706/15 |
| 2015/0310096 | A1* | 10/2015 | Bao | G06F 16/367 |
| | | | | 707/738 |
| 2016/0034809 | A1* | 2/2016 | Trenholm | G06N 3/02 |
| | | | | 706/20 |
| 2016/0055426 | A1* | 2/2016 | Aminzadeh | G06N 20/00 |
| | | | | 706/12 |
| 2017/0091613 | A1 | 3/2017 | Ito et al. | |
| 2017/0249387 | A1* | 8/2017 | Hatami-Hanza | G06N 5/02 |
| 2018/0053115 | A1* | 2/2018 | Vachhani | G06Q 30/0204 |
| 2018/0158078 | A1* | 6/2018 | Hsieh | G06N 7/005 |
| 2018/0165554 | A1* | 6/2018 | Zhang | G06K 9/6256 |
| 2018/0262525 | A1* | 9/2018 | Yan | H04L 63/1425 |
| 2018/0300580 | A1* | 10/2018 | Bradford | G06K 9/623 |
| 2018/0306609 | A1* | 10/2018 | Agarwal | G01D 5/00 |
| 2019/0079885 | A1* | 3/2019 | Staudenmaier | G06F 17/16 |
| 2019/0219994 | A1* | 7/2019 | Yan | G05B 13/027 |
| 2019/0228286 | A1* | 7/2019 | Saito | G06N 3/105 |
| 2019/0228302 | A1* | 7/2019 | Saito | G06N 3/105 |
| 2020/0388028 | A1* | 12/2020 | Agus | G16H 30/40 |

FOREIGN PATENT DOCUMENTS

| | | |
|---|---|---|
| JP | 2016-162437 | 9/2016 |
| JP | 2017-068608 | 4/2017 |

\* cited by examiner

THREE DIMENSIONS

| TIMING | SENSOR 1 | SENSOR 2 | CONNECTION INFORMATION |
|--------|----------|----------|------------------------|
| 0 | A | B | 1 |
| 0 | B | A | 1 |
| 0 | A | C | 0 |
| 0 | C | A | 0 |
| ... | | | |
| t-1 | A | B | 1 |
| t-1 | B | A | 1 |
| t-1 | A | C | 0 |
| t-1 | C | A | 0 |
| ... | | | |
| t | A | B | 0 |
| t | B | A | 0 |
| t | A | C | 0 |
| t | C | A | 0 |
| ... | | | |

TILL TIMING t-1, SENSORS A AND B ARE CONNECTED

AT TIMING t, CONNECTION BETWEEN SENSORS A AND B IS LOST

FIG.8
ERRONEOUSLY-DETECTED GRAPH WHEN ORDER INFORMATION IS ADDED AS AXIS
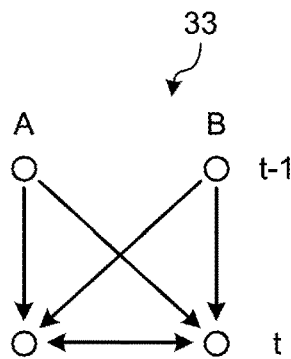
GRAPH OF DETERMINATION RULE
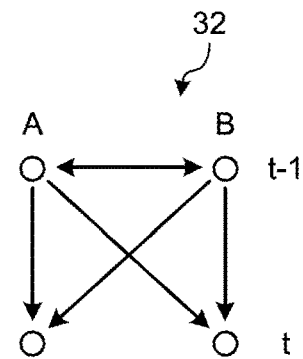
≠ [SINCE THERE IS NO MATCH WITH GRAPH OF DETERMINATION RULE, OCCURRENCE OF MALFUNCTIONING IS NOT DETECTED ⇒ERRONEOUS DETECTION IS NOT PERFORMED]
FIG.9
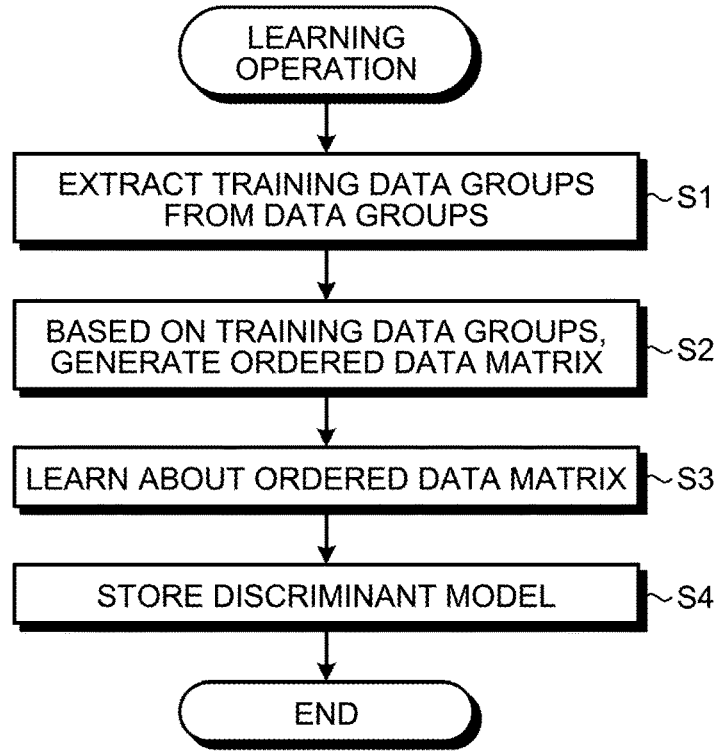

FIG.10

```
    ( DISCRIMINATION
       OPERATION )
              │
              ▼
  ┌──────────────────────────────┐
  │  OBTAIN NEW DATA GROUPS      │─ S11
  └──────────────────────────────┘
              │
              ▼
  ┌──────────────────────────────┐
  │  BASED ON NEW DATA GROUPS,   │─ S12
  │  GENERATE ORDERED DATA MATRIX│
  └──────────────────────────────┘
              │
              ▼
  ┌──────────────────────────────┐
  │  USING DISCRIMINANT MODEL,   │─ S13
  │  DISCRIMINATE ORDERED DATA MATRIX │
  └──────────────────────────────┘
              │
              ▼
  ┌──────────────────────────────┐
  │  OUTPUT DISCRIMINATION RESULT│─ S14
  └──────────────────────────────┘
              │
              ▼
           ( END )
```

FIG.11

CHEMICAL COMPOUND D (CH4)

LABEL $$\begin{array}{c} \phantom{C} \\ C \\ H \\ H \\ H \\ H \end{array} \begin{array}{c} C\ H\ H\ H\ H \\ \left[\begin{array}{ccccc} 0 & 1 & 1 & 1 & 1 \\ 1 & 0 & 0 & 0 & 0 \\ 1 & 0 & 0 & 0 & 0 \\ 1 & 0 & 0 & 0 & 0 \\ 1 & 0 & 0 & 0 & 0 \end{array}\right] \end{array}$$

CHEMICAL COMPOUND E (NH3)

LABEL $$\begin{array}{c} \phantom{N} \\ N \\ H \\ H \\ H \end{array} \begin{array}{c} N\ H\ H\ H \\ \left[\begin{array}{cccc} 0 & 1 & 1 & 1 \\ 1 & 0 & 0 & 0 \\ 1 & 0 & 0 & 0 \\ 1 & 0 & 0 & 0 \end{array}\right] \end{array}$$

COMPUTER-READABLE RECORDING MEDIUM, LEARNING METHOD, AND LEARNING DEVICE

CROSS-REFERENCE TO RELATED APPLICATION

This application is based upon and claims the benefit of priority of the prior Japanese Patent Application No. 2018-007440, filed on Jan. 19, 2018, the entire contents of which are incorporated herein by reference.

FIELD

The embodiments discussed herein are related to a computer-readable recording medium, a learning method, and a learning device.

BACKGROUND

In recent years, it has been proposed to apply machine learning in abnormality detection. For example, in the case of performing abnormality detection using a plurality of sensors, it has been proposed to learn about the relationship between the individual value of each sensor and the abnormality using a neural network, and to perform abnormality detection on a sensor-by-sensor basis. Moreover, a graph structure learning technology is known that enables deep machine learning of data of a graph structure (hereinafter, one configuration of the device for performing such graph structure learning is called a "Deep Tensor").

[Patent Literature 1] Japanese Laid-open Patent Publication No. 2014-059754
[Patent Literature 2] Japanese Laid-open Patent Publication No. 2017-068608
[Patent Literature 3] Japanese Laid-open Patent Publication No. 2015-088188
[Patent Literature 4] Japanese Laid-open Patent Publication No. 2016-162437
[Non-patent Literature 1] "Deep Tensor: Eliciting New Insights from Graph Data that Express Relationships between People and Things", written by Koji Maruhashi, Fujitsu Sci. Tech. J., Vol. 53, No. 5, pp. 26-31 (September 2017)

In a Deep Tensor, as a result of using the data of a graph structure, abnormality detection can be performed not only based on the relationship between the individual value of each of a plurality of sensors and the abnormality but also based on the relationship among a plurality of sensors. For example, a coefficient of correlation is calculated using the observation value of each set of sensor information in a predetermined duration, and a graph structure that is formed by connecting the sensors having the correlation equal to or higher than a certain level is input. As a result, it becomes possible to learn a malfunction detection rule, such as "malfunctioning occurs unless there is a strong correlation between sensors A and B".

However, in a Deep Tensor, since the input data is processed as a graph, there is arbitrariness in the node sequence. Hence, it is not possible to handle sequence information such as the anteroposterior relationship of time as it is. For example, regarding a detection rule such as "in a device having a strong correlation between the sensors A and B in the normal state, malfunctioning occurs when that relationship is lost" (if a strong correlation between the sensors A and B is not present even during the normal state, then malfunctioning is not determined to have occurred); unless a measure such as providing a separate feature quantity is taken, it is not possible to perform the learning in a correct manner. As a result, for example, regarding the phenomenon in which the state of not having a correlation between the sensors A and B changes to the state in which there is a strong correlation; there are times when malfunctioning is determined to have occurred regardless of the fact that the anteroposterior relationship of time is reversed. That is, even if the data of a plurality of sensors is input as it is to a Deep Tensor, it becomes difficult to learn about the relationship in which the ordering is called into question.

SUMMARY

According to an aspect of an embodiment, a non-transitory computer-readable recording medium stores a learning program that causes a computer to execute a process including: extracting, from a plurality of data groups, a plurality of first data groups having an order; generating, for each data element corresponding to each of the first data groups, an ordered data matrix in which data elements having same order have value corresponding to relationship among the data elements and data elements having different orders have values corresponding to the different orders; and obtaining input tensor data by performing tensor decomposition with the ordered data matrix, inputting the input tensor data to a neural network at time of performing deep machine learning, performing deep machine learning of the neural network, and learning about method for the tensor decomposition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an exemplary case in which the time axis is added to an inter-node incidence matrix;
FIG. 8 is a diagram illustrating an example of the case in which there is no erroneous detection;
FIG. 9 is a flowchart for explaining an example of the learning operation according to the first embodiment;
FIG. 10 is a flowchart for explaining an example of the discrimination operation according to the first embodiment;
FIG. 11 is a diagram illustrating an example of the input data used in ranking learning.

DESCRIPTION OF EMBODIMENTS

Preferred embodiments of the present invention will be explained with reference to accompanying drawings. However, the disclosed technology is not limited by the embodiments described below. Moreover, the embodiments can be appropriately combined without causing any contradiction.

[a] First Embodiment

Figure 1:
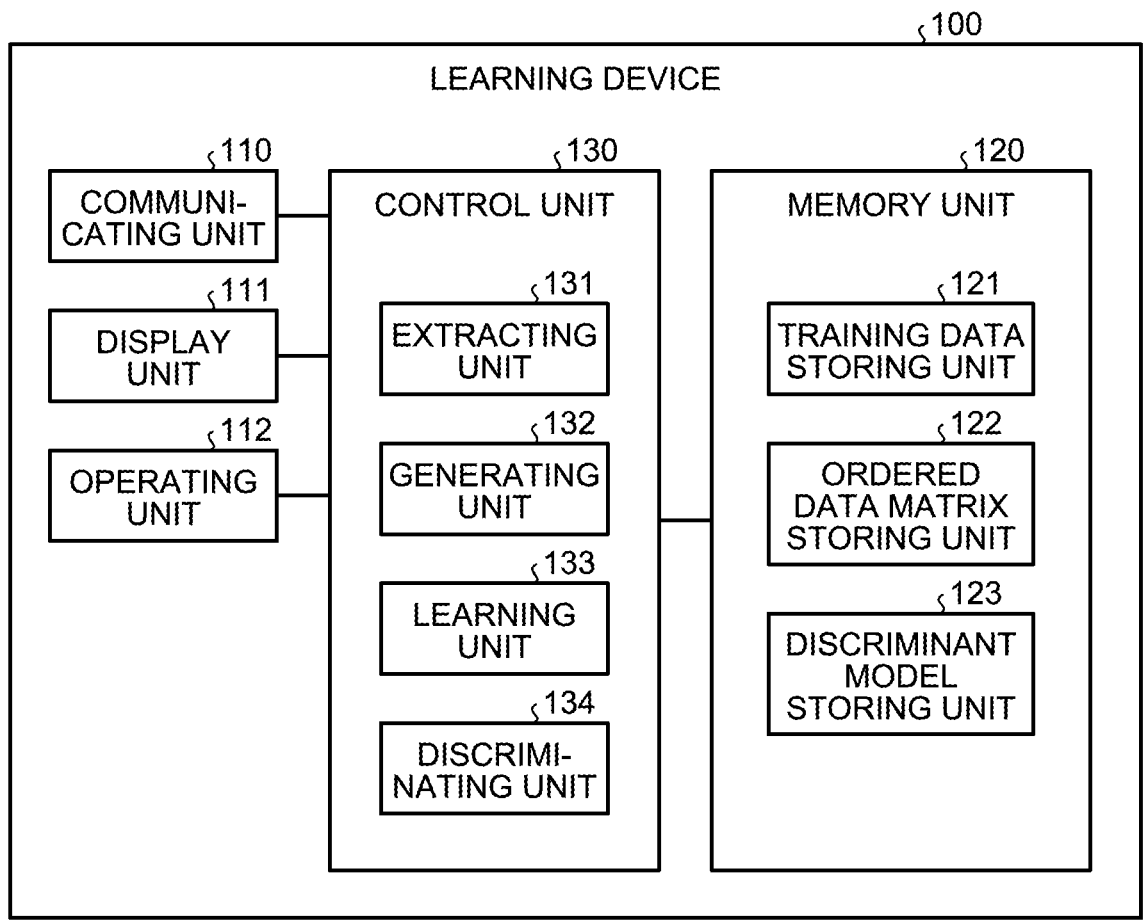
FIG. 1 is a block diagram illustrating an exemplary configuration of a learning device according to a first embodiment.

FIG. 1 is a block diagram illustrating an exemplary configuration of a learning device according to a first embodiment. A learning device 100 illustrated in FIG. 1 is an example of a learning device that generates a discriminant model using a Deep Tensor meant for performing deep machine learning of the data of a graph structure, and that discriminates the data of a new graph structure using the discriminant model. The learning device 100 extracts, from a plurality of data groups, a plurality of first data groups having an order. Regarding the data elements corresponding to each first data group, the learning device 100 generates an ordered data matrix in which the data elements having the same order have the value corresponding to the relationship among themselves and the data elements having different orders have values corresponding to the different orders among themselves. Then, the learning device 100 performs tensor decomposition with the ordered data matrix serving as the input tensor data; inputs the ordered data matrix in a neural network at the time of performing deep machine learning; and performs deep machine learning of the neural network as well as learns about the method for tensor decomposition. As a result, the learning device 100 becomes able to learn about the relationship including the order of the learning targets.

Firstly, the explanation is given about a Deep Tensor. A Deep Tensor implies deep learning in which a tensor (graph information) serves as the input, and in which a neural network is learnt and a partial graph structure contributing to the discrimination is automatically extracted. The extraction operation is carried out by learning about the neural network and learning about the parameters of tensor decomposition of the input tensor data.

Figure 2:
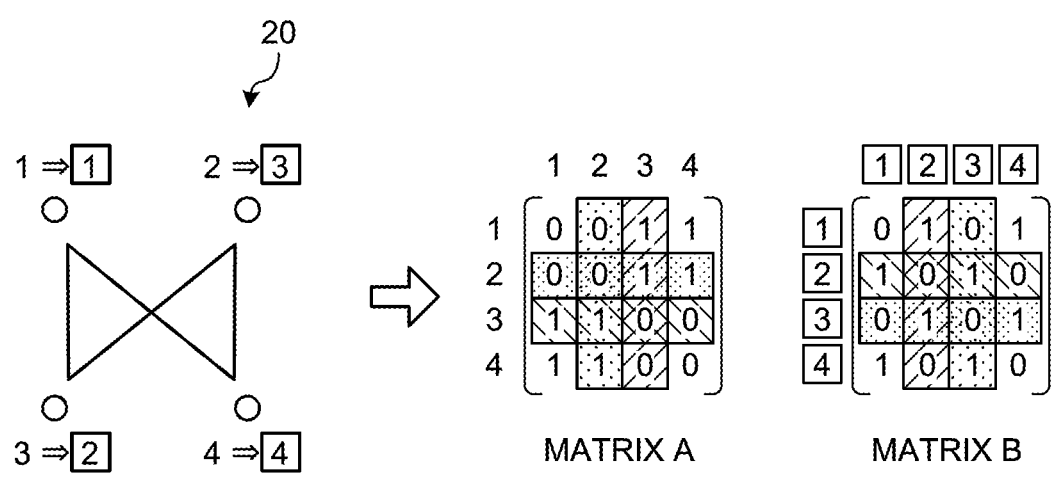
FIG. 2 is a diagram illustrating an example of the relationship between a graph structure and a tensor.
Figure 3:
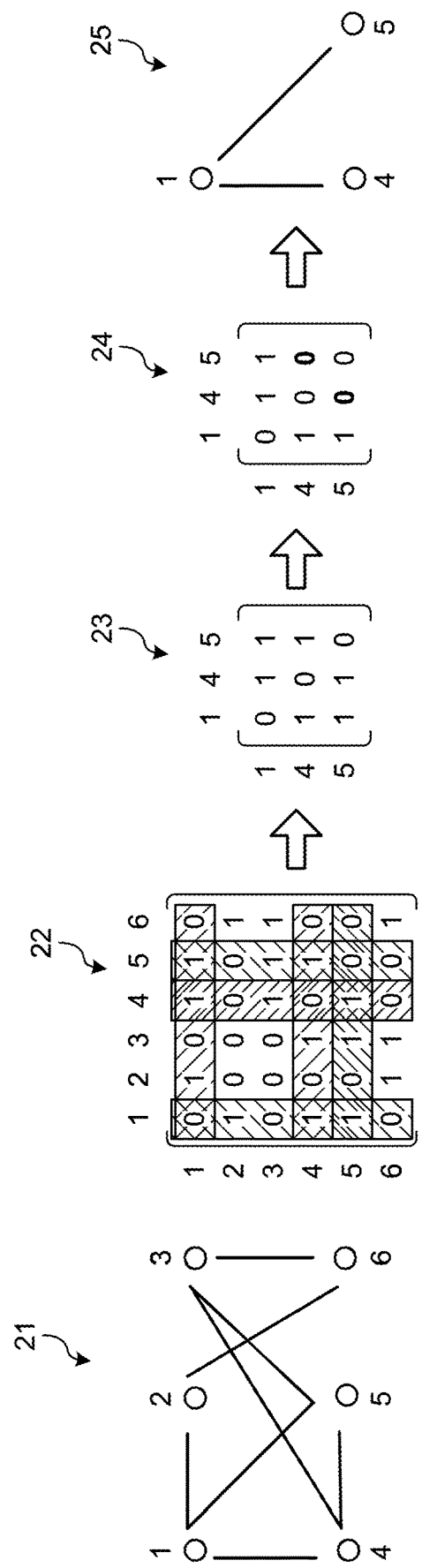
FIG. 3 is a diagram illustrating an example of extraction of a partial graph structure.

Explained below with reference to FIGS. 2 and 3 is a graph structure. FIG. 2 is a diagram illustrating an example of the relationship between a graph structure and a tensor. In a graph 20 illustrated in FIG. 2, four nodes are joined by edges that represent the inter-node relationships (for example, "the coefficient of correlation is equal to or greater than a predetermined value"). Moreover, when two nodes are not joined by edges, it implies that the concerned nodes do not have any relationship. In the case of expressing the graph 20 as a rank-2 tensor, that is, as a matrix; for example, the matrix expression based on the numbers written on the left-hand side of the nodes is given in a "matrix A", and the matrix expression based on the numbers written on the right-hand side of the nodes (i.e., the numbers enclosed by encircling lines) is given in a "matrix B". Regarding the elements of these matrices, when two nodes are joined (connected), the corresponding element is expressed as "1"; and, when two nodes are not joined (not connected), the corresponding element is expressed as "0". In the following explanation, such matrices are also called incidence matrices. Herein, the "matrix B" can be generated by concurrently substituting the second and third rows as well as the second and third columns of the "matrix A". In a Deep Tensor, such substitution is used and the processing is performed by ignoring the differences in the order. That is, in a Deep Tensor, the ordering of the "matrix A" and the "matrix B" is ignored, and the matrices are treated as the same graph, Meanwhile, also regarding the tensors having the rank 3 or higher, the identical processing is performed.

FIG. 3 is a diagram illustrating an example of extraction of a partial graph structure. In a graph 21 illustrated in FIG. 3, six nodes are joined by edges. If the graph 21 is to be expressed as a matrix (tensor), it can be expressed as a matrix 22. With respect to the matrix 22, in order to be able to extract a partial graph structure, the following arithmetic operations are combined: an arithmetic operation for interchanging particular rows and columns; an arithmetic operation for extracting particular rows and columns; and an arithmetic operation for substituting the non-zero elements in the incidence matrix with zero are combined. For example, when a matrix corresponding to the nodes 1, 4, and 5 in the matrix 22 is extracted, a matrix 23 is obtained. Subsequently, when the values for the nodes 4 and 5 in the matrix 23 are substituted with zero, a matrix 24 is obtained. Moreover, the partial graph structure corresponding to the matrix 24 is obtained as a graph 25.

The extraction operation for extracting such a partial graph structure is carried out using a mathematic operation called tensor decomposition. In tensor decomposition, a rank-n tensor that is input is approximated using the product of tensors having the ranks equal to or lower than the rank n. For example, the rank-n tensor that is input is approximated using the product of a single rank-n tensor (called a core tensor) and n number of tensors having lower ranks (when n>2 holds true, usually a rank-2 tensor, that is, a matrix is used). This decomposition is non-unique, and an arbitrary partial graph structure from the graph structure represented by the input data can be included in the core tensor.

Figure 5:
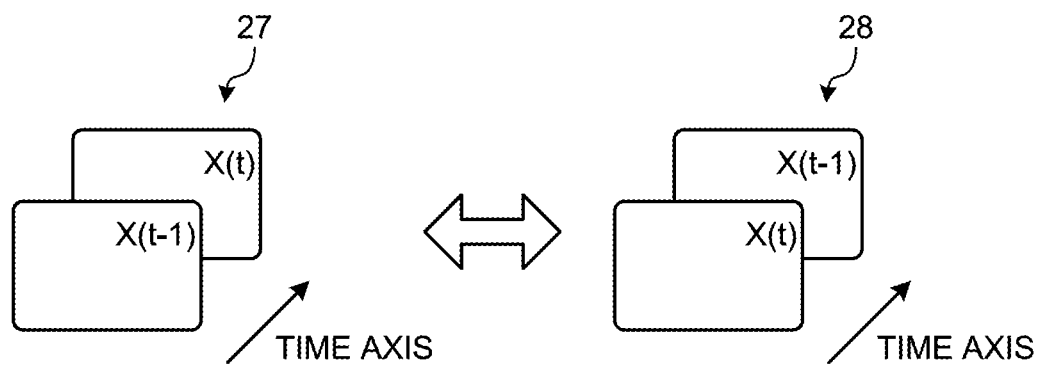
FIG. 5 is a diagram illustrating an example of undifferentiated data.

Explained below with reference to FIGS. 4 and 5 is a case in which a three-dimensional array, which is formed by adding the time axis to an inter-sensor incidence matrix (rank-2 tensor) at each timing, is treated as the input to the Deep Tensor. Herein, assume that the discrimination rule to be learnt is as follows: "when the sensors A and B get connected (have a strong correlation) in the normal state, that relationship is lost when malfunctioning occurs". This discrimination rule is based on the changes in an incidence matrix X(t−1) of the most recent timing (t−1) and the changes in an incidence matrix X(t) of the current timing (t); and enables discrimination only when the two matrices, namely, the incidence matrix X(t−1) and the incidence matrix X(t) are used. Meanwhile, examples of the measurement targets of the sensors A and B include the engine rotation count, the velocity, and the acceleration. For example, in case the acceleration does not increase regardless of the fact that the engine rotation count has increased, it is possible to think of issuing a warning attributed to the weakening correlation.

FIG. 4 is a diagram illustrating an exemplary case in which the time axis is added to an inter-node incidence matrix. A table 26 illustrated in FIG. 4 represents the table form of a three-dimensional array formed by adding the time axis to an inter-node incidence matrix. That is, in the table 26, a three-dimensional array of "timing", "sensor 1", and "sensor 2" has connection information (expressed using connection: 1 and non-connection: 1) associated thereto. As illustrated in the table 26, from a timing "0" to the timing "t−1", the sensors A and B are connected. However, at the timing "t", the sensors A and B become non-connected. When input to the Deep Tensor, the three-dimensional array illustrated in the table 26 is treated as a rank-3 tensor in the Deep Tensor. Hence, the ordering of the timing is ignored, and thus the intended processing is not carried out.

That is, the operation of adding the time axis is equivalent to arranging a graphs X(t) and X(t−1), and can be expressed as (graph structure of X(t−1), graph structure of X(t)). On the other hand, regarding the new graph formed by arranging the two graphs, the ordering is interchangeable because of the treatment as a graph. That is, the abovementioned graph has the same form as (graph structure of X(t), graph structure X(t−1)). For that reason, even if the changes in the graph structure in the most recent graph are to be used as the discrimination rule as illustrated the table 26, the reversal of the order is allowed based on the nature of the graphs, thereby making the processing less than successful.

FIG. 5 is a diagram illustrating an example of undifferentiated data. In FIG. 5 is illustrated the relationship between the graph X(t), the graph X(t−1), and the time axis. Regarding three-dimensional array data 27, since the ordering in each axis carries no significance in the Deep Tensor, it does not get differentiated from three-dimensional array data 28 in which the graph X(t) and the graph X(t−1) are mutually replaced in the time axis. That is, a partial graph structure representing that "the relationship of connection between the sensors A and B is lost at the timing t" is not differentiated from a partial graph structure representing that "the relationship of connection between the sensors A and B is established at the timing t". Thus, even if the former partial graph structure could be learnt as a discrimination rule; that discrimination rule matches also with the later partial graph structure, thereby leading to erroneous detection. In contrast, in the first embodiment, information representing the order is added to the original input data so as to form a new graph, and the new graph is treated as the input data. That makes it possible to learn about the relationship in which the ordering is called into question.

Given below is the explanation of a configuration of the learning device 100. As illustrated in FIG. 1, the learning device 100 includes a communicating unit 110, a display unit 111, an operating unit 112, a memory unit 120, and a control unit 130. Moreover, apart from the functional units illustrated in FIG. 1, the learning device 100 can include various known functional units of a computer, such as various input devices and various sound output devices.

The communicating unit 110 is implemented using, for example, a network interface card (NIC). The communicating unit 110 is a communication interface that is connected to other information processing devices via a network (not illustrated), and that controls the communication of information with other information processing devices. For example, the communicating unit 110 receives data groups for learning and target data groups for discrimination from a terminal of the administrator. Moreover, the communicating unit 110 sends the learning result and the discrimination result to the terminal of the administrator.

The display unit 111 is a display device for displaying a variety of information. For example, the display unit 111 is configured using a liquid crystal display as the display device. The display unit 111 is used to display various screens, such as a display screen, that are input from the control unit 130.

The operating unit 112 is an input device meant for receiving various operations from the user of the learning device 100. For example, the operating unit 112 can be configured using a keyboard or a mouse as the input device.

The operating unit 112 outputs the user-input information as operation information to the control unit 130. Meanwhile, the operating unit 112 can be configured using a touch-sensitive panel as the input device. Alternatively, the display device of the display unit 111 and the input device of the operating unit 112 can be configured in an integrated manner.

The memory unit 120 is implemented, for example, using a semiconductor memory element such as a random access memory (RAM) or a flash memory; or using a memory device such as a hard disk or an optical disc. The memory unit 120 includes a training data storing unit 121, an ordered data matrix storing unit 122, and a discriminant model storing unit 123. Moreover, the memory unit 120 is used to store the information to be used in the operations performed by the control unit 130.

The training data storing unit 121 is used to store training data groups that represent, for example, a plurality of first data groups having an order and extracted from a plurality of data groups input via the communicating unit 110. In the example of the sensors A and B given earlier, in the training data storing unit 121, X(t−1) and X(t) that represent the data groups (graphs) of the timing "t−1" and "t", respectively, and that are extracted from a plurality of data groups corresponding to the timings from the timing "0" to the timing "t" are stored as training data groups.

The ordered data matrix storing unit 122 stores an ordered data matrix, that is, a tensor that expresses each set of training data (graph) in the training data group as a matrix. In the example of the sensors A and B given earlier, an ordered data matrix Y that is given below in Equation (1) and that is formed by adding the order to the graphs X(t−1) and X(t) is stored.

$$Y = \begin{pmatrix} X(t-1) & I \\ O & X(t) \end{pmatrix} \qquad (1)$$

When n represents the number of nodes constituting the graph X; I represents an n×n matrix having all elements to be equal to "1" (hereinafter, called a 1-matrix). Moreover, O represents an n×n matrix having all elements to be equal to "0" (hereinafter, called a zero-matrix). In the ordered data matrix Y, the inter-node orders are defined according to the matrix I and the matrix O.

In an identical manner, in the case of treating three graphs (training data groups) X(t−2), X(t−1), and X(t) as the input, the ordered data matrix Y can be written as given below in Equation (2). Also in the case of treating four or more graphs as the input, the ordered data matrix Y can be written in an identical manner.

$$Y = \begin{pmatrix} X(t-2) & I & I \\ O & X(t-1) & I \\ O & O & X(t) \end{pmatrix} \qquad (2)$$

The discriminant model storing unit 123 is used to store a discriminant model that is obtained by performing deep machine learning of the ordered data matrix. The discriminant model is also called a learning model and is used to store, for example, various parameters (weight coefficients) of the neural network and to store the method for tensor decomposition.

Returning to the explanation with reference to FIG. 1, the control unit 130 is implemented, for example, as a result of execution of a computer program, which is stored in an internal memory device, by a central processing unit (CPU) or a micro processing unit (MPU) while using the RAM as the work area. Alternatively, the control unit 130 can be implemented using an integrated circuit such as an application specific integrated circuit (ASIC) or a field programmable gate array (FPGA). The control unit 130 includes an extracting unit 131, a generating unit 132, a learning unit 133, and a discriminating unit 134; and implements or executes functions and actions of information processing as described below. Meanwhile, the control unit 130 is not limited to have the internal configuration as illustrated in FIG. 1, and can have some other configuration as long as information processing (described later) can be performed.

The extracting unit 131 extracts, from a plurality of data groups, data groups related to the discrimination rule to be learnt. For example, when a plurality of data groups for learning is received from the terminal of the administrator via the communicating unit 110; the extracting unit 131 extracts the data groups having an order. For example, in the example of the sensors A and B given earlier, the extracting unit 131 extracts the graphs X(t−1) and X(t) representing the data groups before and after a change in the connection information. Then, the extracting unit 131 stores the extracted data groups as training data groups in the training data storing unit 121. Once the training data groups are stored in the training data storing unit 121, the extracting unit 131 outputs a generation instruction to the generating unit 132.

Upon receiving input of a generation instruction from the extracting unit 131, the generating unit 132 refers to the training data storing unit 121 and generates an ordered data matrix based on the training data groups. In the example of the sensors A and B given earlier, the generating unit 132 generates the ordered data matrix Y that is given in Equation (1) and that is formed by adding the order to the graphs X(t−1) and X(t). Then, the generating unit 132 stores the ordered data matrix Y in the ordered data matrix storing unit 122. Once the ordered data matrix Y is stored in the ordered data matrix storing unit 122, the generating unit 132 outputs a learning instruction to the learning unit 133.

Figure 6:
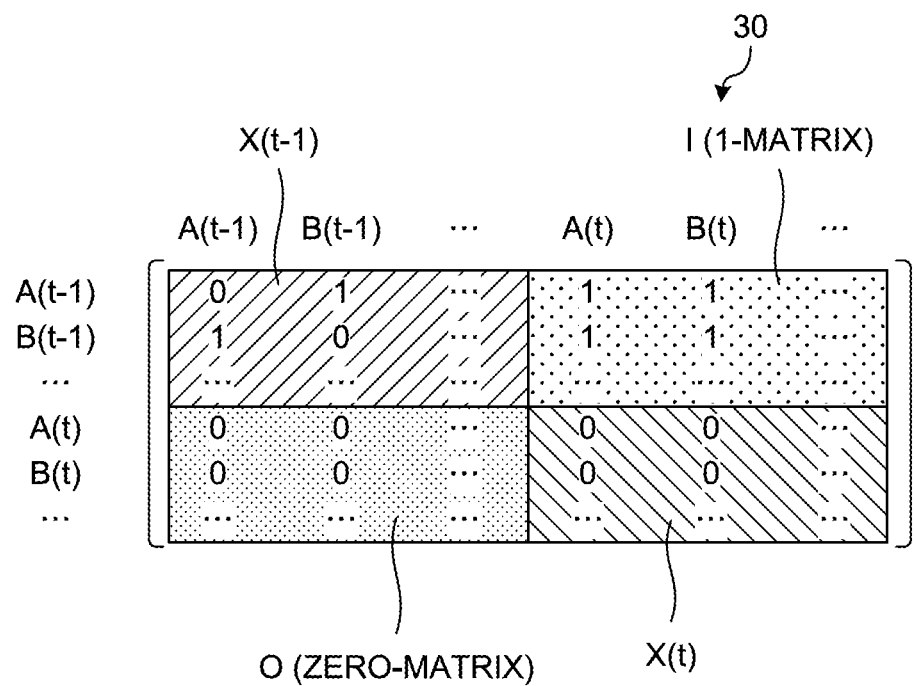
FIG. 6 is a diagram illustrating an example of the input data format.

Explained below with reference to FIG. 6 is the input data format provided to the learning unit 133. FIG. 6 is a diagram illustrating an example of the input data format. As illustrated in FIG. 6, a data matrix 30 is an example of the input data format provided to the learning unit 133, that is, an example of the data format of the ordered data matrix Y. The data matrix 30 includes the graphs X(t−1) and X(t) at the diagonal elements of the matrix, has the upper elements as a result of expansion of the matrix I (1-matrix), and has the lower elements as a result of expansion of the matrix O (zero-matrix); as well as has the rows and the columns made of the data elements of the graphs X(t−1) and X(t). Meanwhile, the upper elements represent the elements that, in a matrix of n rows and m columns, satisfy n<m; and the lower elements represent the elements that, in the matrix of n rows and m columns, satisfy n>m. That is, as illustrated in FIG. 6, the data matrix 30 is formed by combining four matrices.

The data elements of the graphs X(t−1) and X(t) are A(t−1), B(t−1), A(t), and B(t). Moreover, in the data matrix 30, " . . . " indicates that the matrices of data elements increase in number depending on the rank of the tensor of the data matrix 30. That is, in the example of the sensors A and B given earlier, the data matrix 30 represents a rank-2 tensor and represents a matrix having four rows and four columns.

In other words, regarding each data element corresponding to each first data element, the generating unit 132 generates an ordered data matrix in which the data elements having the same order have the value corresponding to the relationship among themselves and the data elements having different orders have values corresponding to the different orders among themselves. Herein, the first data groups corresponds to training data groups. Moreover, the values according to the relationship among the data elements correspond to the elements of the incidence matrix. Moreover, as illustrated in the example of the sensors A and B given earlier, the order corresponds to the temporal sequence, and the generating unit 132 generates the ordered data matrix based on the most recent first data groups and the first data groups at the current timing.

Returning to the explanation with reference to FIG. 1, when a learning instruction is input from the generating unit 132, the learning unit 133 refers to the ordered data matrix storing unit 122 and either generates a discriminant model or updates the discriminant model by learning about the ordered data matrix. That is, the learning unit 133 performs tensor decomposition of the ordered data matrix and generates a core tensor (a partial graph structure). Then, the learning unit 133 inputs the core tensor to the neural network and obtains the output. The learning unit 133 performs the learning in such a way that the error in the output value is reduced, and learns about the parameters of tensor decomposition in such a way that the determination accuracy becomes higher. There is a degree of freedom in tensor decomposition, and examples of the parameters of tensor decomposition include a combination of a decomposition model, constraints, and an optimization algorithm. Examples of the decomposition model include Canonical Polyadic (CP) decomposition and Tucker. Examples of the constraints include orthogonal constraints, sparse constraints, and non-negative constraints. Examples of the optimization algorithm include the alternating least square (ALS), the higher order singular value decomposition (HOSVD), and the higher order orthogonal iteration of tensors (HOOI). In the Deep Tensor, tensor decomposition is performed under the constraint of "the determination accuracy becomes higher".

Subsequently, when the learning is performed for a predetermined number of times or when the error becomes smaller than a predetermined value, the learning unit 133 finishes the learning and stores, as a discriminant model, various parameters and the method for tensor decomposition in the discriminant model storing unit 123. Meanwhile, as the neural network, it is possible to use various neural networks such as the recurrent neural network. Moreover, as the learning method, it is possible to implement various methods such as the error backpropagation method.

Figure 7:
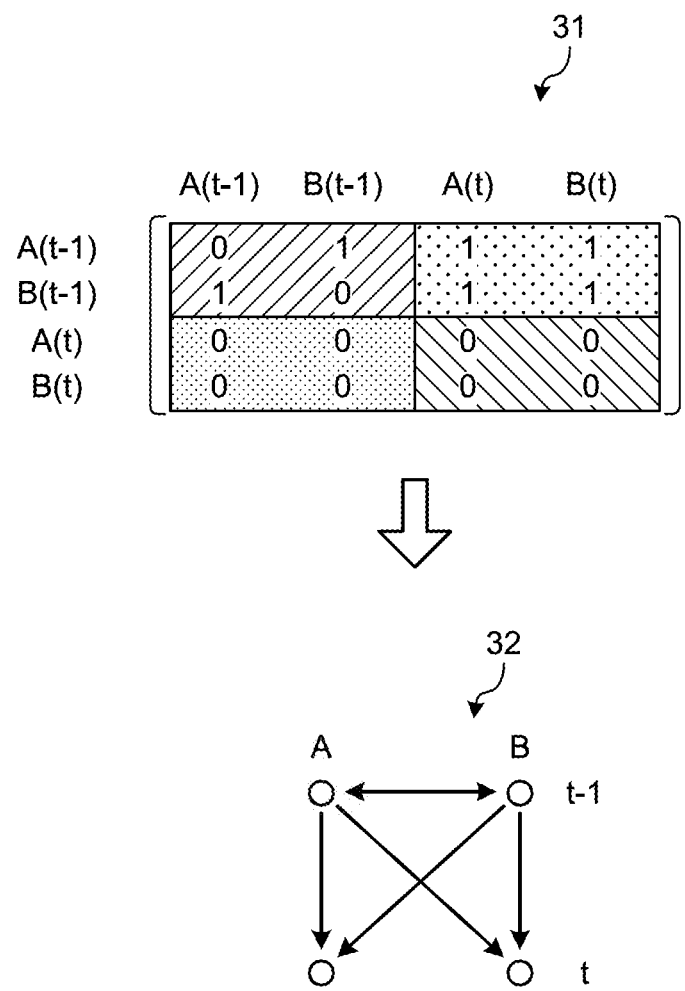
FIG. 7 is a diagram illustrating an example of the discrimination rule that is learnt.

Explained below with reference to FIG. 7 is the discrimination rule that is learnt. FIG. 7 is a diagram illustrating an example of the discrimination rule that is learnt. A matrix 31 illustrated in FIG. 7 represents the discrimination rule of the discriminant model learnt in the example of the sensors A and B given earlier. Herein, the learnt discrimination rule is "when the sensors A and B get connected (have a strong correlation) in the normal state, that relationship is lost when malfunctioning occurs". A graph 32 represents the matrix 31, and represents the correlation between the sensors A and B at the timings t−1 and t. Meanwhile, the arrows of the edges represent digraphs. In this discriminant model, when the target data groups for discrimination include the partial graph structure represented by the graph 32, the occurrence of malfunctioning can be detected.

In other words, the learning unit 133 performs tensor decomposition with the generated ordered data matrix serving as the input tensor data; inputs the ordered data matrix in the neural network at the time of performing deep machine learning; and performs deep machine learning of the neural network as well as learns about the method for tensor decomposition.

Returning to the explanation with reference to FIG. 1, after learning about the discriminant model, the discriminating unit 134 obtains new data groups and outputs the discrimination result obtained by performing the discrimination using the discriminant model. For example, when the target data groups for discrimination are received from the administrator, the discriminating unit 134 obtains the received data groups as the new data groups. Moreover, in an identical manner to the generating unit 132 at the time of learning, the discriminating unit 134 generates an ordered data matrix based on the obtained new data groups.

The discriminating unit 134 refers to the discriminant model storing unit 123 and determines the ordered data matrix using the discriminant model. That is, the discriminating unit 134 builds a neural network in which various parameters of the discriminant model are set, and sets the method for tensor decomposition. The discriminating unit 134 performs tensor decomposition of the ordered data matrix; inputs the ordered data matrix to the neural network; and obtains the discrimination result. The discriminating unit 134 outputs the discrimination result to the display unit 111 for displaying it, and outputs the discrimination result to the memory unit 120 for storing it.

Explained below with reference to FIG. 8 is a case in which there is no erroneous detection even when the input data is about an ordered relationship. FIG. 8 is a diagram illustrating an example of the case in which there is no erroneous detection. A graph 33 illustrated in FIG. 8 is a graph that is erroneously detected when order information is added as an axis of the incidence matrix as illustrated in FIGS. 4 and 5. In contrast, in the first embodiment, since the order information is stored, the graph 33 does not match with the graph 32 of the determination rule. Thus, even if the data of a graph structure including the graph 33 is input, the discriminating unit 134 does not determine the occurrence of malfunctioning. That is, the discriminating unit 134 does not perform erroneous detection.

Given below is the explanation of the operations performed by the learning device 100 according to the first embodiment. Firstly, the explanation is given about a learning operation for learning about the discriminant model. FIG. 9 is a flowchart for explaining an example of the learning operation according to the first embodiment.

The extracting unit 131 receives, for example, a plurality of data groups for learning from the terminal of the administrator and extracts data groups having an order (Step S1). The extracting unit 131 stores the extracted data groups as training data groups in the training data storing unit 121. Once the training data groups are stored in the training data storing unit 121, the extracting unit 131 outputs a generation instruction to the generating unit 132.

Upon receiving a generation instruction from the extracting unit 131, the generating unit 132 refers to the training data storing unit 121 and generates an ordered data matrix based on the training data groups (Step S2). Then, the generating unit 132 stores the ordered data matrix in the ordered data matrix storing unit 122. Once the ordered data matrix is stored in the ordered data matrix storing unit 122, the generating unit 132 outputs a learning instruction to the learning unit 133.

Upon receiving a learning instruction from the generating unit 132, the learning unit 133 refers to the ordered data matrix storing unit 122 and learns about the ordered data matrix (Step S3). Subsequently, when the learning is performed for a predetermined number of times or when the error becomes smaller than a predetermined value, the learning unit 133 finishes the learning and stores, as a discriminant model, various parameters and the method for tensor decomposition in the discriminant model storing unit 123 (Step S4). As a result, the learning device 100 becomes able to learn about the relationship including the order of the learning targets. Moreover, in the learning device 100, since the data of a graph structure including the order information can be input, it becomes possible to learn about the correlation that is difficult for humans to understand.

Given below is the explanation of a discrimination operation for discriminating new data. FIG. 10 is a flowchart for explaining an example of the discrimination operation according to the first embodiment.

For example, when the target data groups for discrimination are received from the terminal of the administrator, the discriminating unit 134 obtains the received data groups as new data groups (Step S11). Then, based on the obtained new data groups, the discriminating unit 134 generates an ordered data matrix (Step S12). The discriminating unit 134 refers to the discriminant model storing unit 123, and discriminates the ordered data matrix using the discriminant model (Step S13). Subsequently, for example, the discriminating unit 134 outputs the discrimination result to the display unit 111 for displaying it (Step S14). As a result, in the learning device 100, it becomes possible to discriminate the data of a graph structure having the relationship including the order.

In this way, the learning device 100 extracts, from a plurality of data groups, a plurality of first data groups having an order. Moreover, for each data element corresponding to each first data group, the learning device 100 generates an ordered data matrix in which the data elements having the same order have the value corresponding to the relationship among themselves and the data elements having different orders have values corresponding to the orders among themselves. Then, the learning device 100 performs tensor decomposition with the ordered data matrix serving as the input tensor data; inputs the ordered data matrix in the neural network at the time of performing deep machine learning; and performs deep machine learning of the neural network as well as learns about the method for tensor decomposition. As a result, the learning device 100 becomes able to learn the relationship including the order of the learning targets.

In the learning device 100, the order corresponds to the temporal sequence. Moreover, in the learning device 100, an ordered data matrix is generated based on the most recent first data groups and the first data groups at the current timing. As a result, the learning device 100 becomes able to learn about the learning targets including the chronological relationship therebetween.

[b] Second Embodiment

In the first embodiment, the data of a graph structure including the chronological relationship is learnt. Alternatively, it is also possible to learn about ranking as explained below in a second embodiment. In the second embodiment, the learning device 100 fundamentally has an identical configuration to the learning device 100 according to the first embodiment. Hence, the redundant configuration and the redundant operations are not explained again.

In the second embodiment, the learning device 100 learns about ranking for determining which of two sets of input data is higher (larger). Firstly, the explanation is given about the ranking learning (a pairwise method). In the ranking learning, regarding training data (X(i), Y(i)) obtained by linking a feature vector X(i) and an objective variable Y(i); an arbitrary combination of (X(i), Y(i), X(j), Y(j)) is learnt. In the ranking learning, the learning is performed with X(i)–X(j) representing the feature and sgn(Y(i)–Y(j)) representing the objective variable, and a magnitude correlation estimation model is generated. Herein, sgn(v) represents a sign function that takes "1" when v>0 holds true and takes "0" when v<0 holds true.

In the ranking learning, with respect to the new data (assumed to have a feature vector Z(i)) to be learnt, a model is applied that is generated with a difference z(i, j) of an arbitrary combination treated as the feature, and the magnitude correlation of the combination is estimated. Then, based on the estimation result, the new data is ranked.

Meanwhile, if the abovementioned ranking learning is attempted using a Deep Tensor having the data of a graph structure as input, it no more becomes possible to define the difference among the tensors representing the features. For example, when the ranking of the acid levels in a chemical compound is to be learnt, the features and the acid levels of the chemical compound are used. Although the features of a chemical compound are represented as an incidence matrix of the structure of the chemical compound, it is not possible to define the difference among the features. On the other hand, as far as the acid levels are concerned; for example, if pKa is used that, when small, indicates a high acid level, the magnitude correlation of the strength of the acid level, which represents the objective variable, can be defined.

Explained below with reference to FIG. 11 is the input data used in such ranking learning of chemical compounds. FIG. 11 is a diagram illustrating an example of the input data used in ranking learning. As illustrated in FIG. 11, a chemical compound D (CH4) and a chemical compound E (NH3) can be expressed as matrices having C, H, and N as labels (data elements). It is not possible to generically define the difference between two chemical compounds. However, the strength relationship of the acid levels between the chemical compounds can be defined. In the example illustrated in FIG. 11, it can be expressed that "the chemical compound D (CH4)<the chemical compound E (NH3)". That is, the chemical compound E (NH3) has a higher acid level.

In that regard, in the second embodiment, learning and determination (estimation) is performed with an ordering-information-attached tensor of the features X(i) and X(j), that is, the ordered data matrix given below in Equation (3) serving as the features, instead of using the difference among the features. As given in Equation (3), two features and the ordering relationship therebetween serves as the input data. Hence, appropriate learning can be performed.

$$Y = \begin{pmatrix} X(i) & I \\ O & X(j) \end{pmatrix} \quad (3)$$

Figure 12:
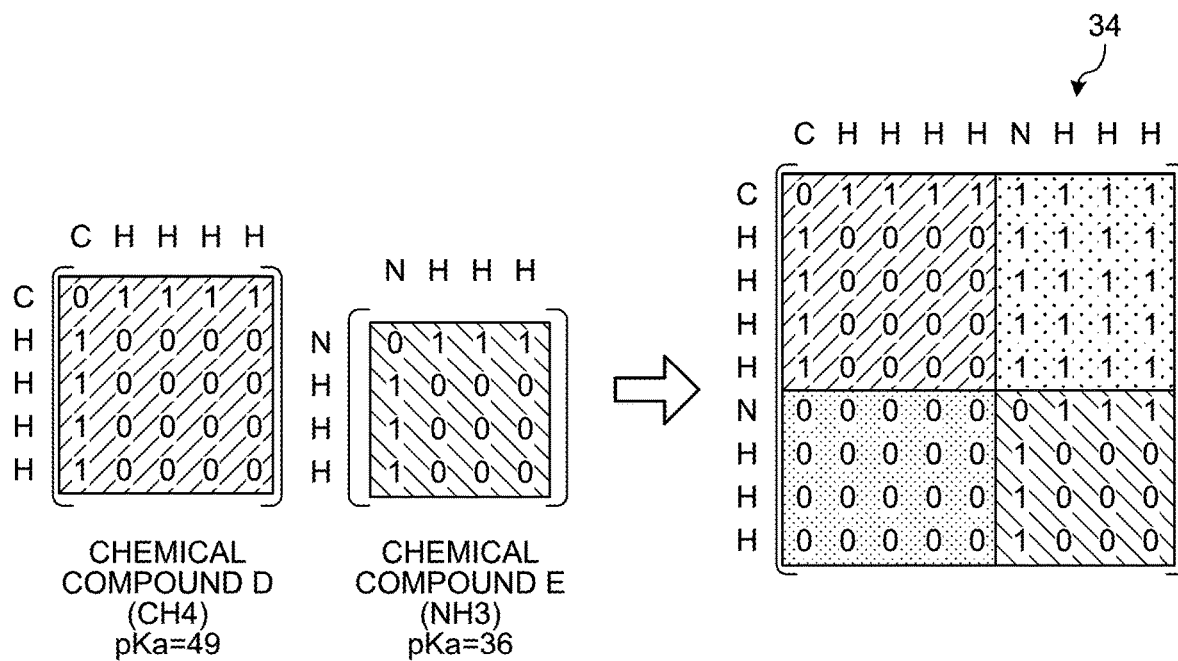
FIG. 12 is a diagram illustrating an example of the input data according to a second embodiment.

FIG. 12 is a diagram illustrating an example of the input data according to the second embodiment. As illustrated in FIG. 12, in the second embodiment, for example, in the case of learning the ranking of the chemical compound D (CH4) and a chemical compound E (NH3), an ordered data matrix as illustrated in a matrix 34 is generated. That is, in the second embodiment, the learning device 100 generates training data with the matrix 34 serving as an explanatory variable and with "1" serving as the objective variable. Meanwhile, regarding the acid levels, the chemical compound D has pKa=49 and the chemical compound E has pKa=36. Hence, the chemical compound E has a higher acid level than the chemical compound D.

Figure 13:
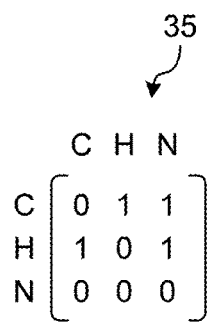
FIG. 13 is a diagram illustrating an example of the learning result according to the second embodiment.

FIG. 13 is a diagram illustrating an example of the learning result according to the second embodiment. In the learning device 100 according to the second embodiment, the strength relationship of the acid levels between a chemical compound including "CH" and a chemical compound in which "CH" is substituted with "N" is treated as training data, so that it can be learnt that a partial graph structure illustrated in a matrix 35 in FIG. 13 contributes in determining the strength of the acid level. The matrix 35 represents the partial graph structure including a digraph "(C—H)→N". In this way, for example, the learning device 100 according to the second embodiment becomes able to learn about the ranking such as the acid levels of chemical compounds.

In this way, in the learning device 100 according to the second embodiment, the order corresponds to the ranking. Moreover, in the learning device 100, based on the two first data groups selected from the first data groups, ordered data matrices are generated that are equal in number corresponding to the total number of first data groups. As a result, the learning device 100 becomes able to learn about the learning targets including the ranking relationship therebetween.

In the embodiments described above, the triaxial data that is used contains two axes that need to be processed as order-ignoring tensors, and contains one axis for which the order needs to be taken into account. However, that is not the only possible case. Alternatively, for example, if n represents the number of axes to be treated as order-ignoring tensors and if m represents the number of axes taking the order into account; even when n and m are equal to or greater than two, they can be handled by expansion. In that case, the tensor X(i) can be configured using the n number of axes representing the order-ignoring tensors. Herein, i represents the i-th sample. Moreover, if the m number of axes taking the order into account are expressed as $a_1$ to $a_m$, then the data can be sequentially structured as given below in Equations (4) and (5). Herein, the ordering relationship is according to the order defined by an axis $a_x$. That is, Equation (4) corresponds to the first ordering axis, and Equation (5) corresponds to the second ordering axis. Subsequently, the data corresponding to the count m can be sequentially structured. In that case, in the learning device 100, an ordered data matrix $Y_m$ generated in this manner is treated as the input data. As a result, in the learning device 100 in such a case, even if there are two or more axes taking the order into account, it becomes possible to implement the learning methods according to the embodiments described above.

$$Y_1(i, j) = \begin{pmatrix} X(i) & I \\ O & X(j) \end{pmatrix} \quad (4)$$

$$Y_2(i, j, k) = \begin{pmatrix} Y_1(i, j) & I \\ O & Y_1(i, j) \end{pmatrix} \quad (5)$$

In the embodiments described above, although the RNN is given as an example of the neural network, that is not the only possible case. Alternatively, for example, it is possible to use various neural networks such as a convolutional neural network (CNN). Moreover, regarding the learning method too, it is possible to implement various known methods other than the error backpropagation method. A neural network has a multistage configuration including, for example, an input layer, an intermediate layer (a hidden layer), and an output layer; and each layer has a plurality of nodes joined by edges. Each layer has a function called an "activating function"; the edges have "weight"; and the value of each node is calculated from the values of the nodes in the previous layer, the values of the weights of the joining edges, and the activating function of the concerned layer. Regarding the calculation method, various known methods can be implemented. Meanwhile, as far as machine learning is concerned, various techniques such as the support vector machine (SVM) can be used instead of a neural network.

The constituent elements of the device illustrated in the drawings are merely conceptual, and need not be physically configured as illustrated. The constituent elements, as a whole or in part, can be separated or integrated either functionally or physically based on various types of loads or use conditions. For example, the extracting unit 131 and the generating unit 132 can be integrated. Moreover, the operations explained with reference to the drawings are not limited to the sequence explained above, and can be performed in a concurrent manner or in a different manner without causing any contradiction in the operation details.

The various processing functions performed by the devices can be entirely or partially implemented by a CPU (or by a microcomputer such as an MPU or a micro controller unit (MCU)); or can be entirely or partially implemented by computer programs that are analyzed and executed by a CPU (or by a microcomputer such as an MPU or a micro controller unit (MCU)), or can be entirely or partially implemented as hardware using wired logic.

Figure 14:
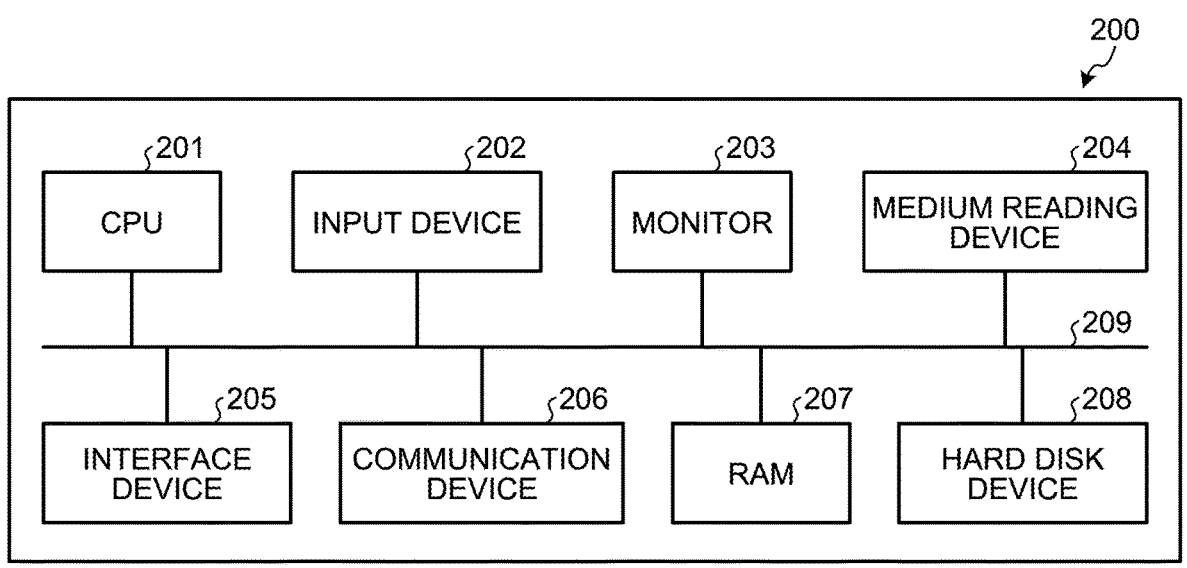
FIG. 14 is a diagram illustrating an exemplary computer that executes a learning program.

Meanwhile, the various operations explained in the embodiments described above can be implemented when a computer executes a prepared computer program. In that regard, given below is the explanation of an exemplary computer that executes a computer program having the identical functions to the functions according to the embodiments described above. FIG. 14 is a diagram illustrating an exemplary computer that executes a learning program.

As illustrated in FIG. 14, a computer 200 includes a CPU 201 that performs various arithmetic operations; an input device 202 that receives data input; and a monitor 203. Moreover, the computer 200 includes a medium reading device 204 that reads computer programs from a memory medium; an interface device 205 that enables establishing connection with various devices; and a communication device 206 that enables establishing wired connection or wireless connection with other information processing devices. Furthermore, the computer 200 includes a RAM 207 for temporarily storing a variety of information; and a hard disk device 208. Herein, the devices 201 to 208 are connected to each other by a bus 209.

In the hard disk device 208 is stored a learning program that has identical functions to the functions of the extracting unit 131, the generating unit 132, the learning unit 133, and the discriminating unit 134. Moreover, in the hard disk device 208 is stored a variety of data meant for implementing the training data storing unit 121, the ordered data matrix storing unit 122, the discriminant model storing unit 123, and the learning program. The input device 202 receives, for example, input of a variety of information such as operation information from the administrator of the computer 200. The monitor 203 displays, for example, various screens such as display screens to the administrator of the computer 200.

The interface device 205 is connected to, for example, a printing device. The communication device 206 is connected to, for example, a network (not illustrated) having identical functions to the functions of the communicating unit 110 illustrated in FIG. 1; and communicates a variety of information with other information processing devices.

The CPU 201 reads computer programs stored in the hard disk device 208, loads the computer programs in the RAM 207, and executes them for performing various operations. These computer programs can make the computer 200 function as the extracting unit 131, the generating unit 132, the learning unit 133, and the discriminating unit 134 illustrated in FIG. 1.

Meanwhile, the learning program need not always be stored in the hard disk device 208. Alternatively, for example, the computer 200 can read the computer programs stored in a memory medium readable by the computer 200, and execute the computer programs. Examples of the memory medium readable by the computer 200 include a portable memory medium such as a compact disc read only memory (CD-ROM), a digital versatile disc, or a universal serial bus (USB) memory; a semiconductor memory such as a flash memory; and a hard disk drive. Alternatively, the learning program can be stored in a device connected to a public line, the Internet, or a local area network (LAN), and the computer 200 can read the learning program from the device and execute it.

In this way, it becomes possible to learn about the relationship including the order of the learning targets.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a learning program that causes a computer to execute a process comprising:

extracting, from a plurality of data groups, a plurality of first data groups having an order;

generating, for each data element corresponding to each of the first data groups, an ordered data matrix in which data elements having same order have value corresponding to relationship among the data elements and data elements having different orders have values corresponding to the different orders, all upper elements of the ordered data matrix having a first value and all lower elements of the ordered data matrix having a second value; and obtaining input tensor data by performing tensor decomposition with the ordered data matrix, inputting a result of the tensor decomposition with the ordered data matrix to a neural network at time of performing deep machine learning, performing deep machine learning of the neural network, and performing update of parameters of the tensor decomposition.

2. The non-transitory computer-readable recording medium according to claim 1, wherein the order corresponds to temporal sequence, and the generating includes generating the ordered data matrix based on most recent of the first data groups and based on the first data groups at current timing.

3. The non-transitory computer-readable recording medium according to claim 1, wherein
the order corresponds to ranking, and
the generating includes generating, based on two first data groups selected from the first data groups, the ordered data matrix equal in number corresponding to total number of the first data groups.

4. A learning method comprising:
extracting, from a plurality of data groups, a plurality of first data groups having an order, using a processor;
generating, for each data element corresponding to each of the first data groups, an ordered data matrix in which data elements having same order have value corresponding to relationship among the data elements and data elements having different orders have values corresponding to the different orders, all upper elements of the ordered data matrix having a first value and all lower elements of the ordered data matrix having a second value, using the processor; and
obtaining input tensor data by performing tensor decomposition with the ordered data matrix, inputting a result of the tensor decomposition with the ordered data matrix to a neural network at time of performing deep machine learning, performing deep machine learning of the neural network, and performing update of parameters of the tensor decomposition, using the processor.

5. A learning device comprising:
a memory; and
a processor coupled to the memory, wherein the processor executes a process comprising:
extracting, from a plurality of data groups, a plurality of first data groups having an order;
generating, for each data element corresponding to each of the first data groups, an ordered data matrix in which data elements having same order have value corresponding to relationship among the data elements and data elements having different orders have values corresponding to the different orders, all upper elements of the ordered data matrix having a first value and all lower elements of the ordered data matrix having a second value; and
obtaining input tensor data by performing tensor decomposition with the ordered data matrix, inputting a result of the tensor decomposition with the ordered data matrix to a neural network at time of performing deep machine learning, performing deep machine learning of the neural network, and performing update of parameters of the tensor decomposition.

* * * * *